(12) United States Patent
Lider et al.

(10) Patent No.: US 9,280,580 B1
(45) Date of Patent: Mar. 8, 2016

(54) CUSTOMIZING SEARCH

(71) Applicant: GOOGLE INC., Mountain View, CA (US)

(72) Inventors: Brett R. Lider, San Francisco, CA (US); Adam D. Bursey, San Jose, CA (US); Jon M. Wiley, Mountain View, CA (US); Kavi Harshawat, San Francisco, CA (US); Charles H. Warren, San Francisco, CA (US); Robert J. Spiro, San Francisco, CA (US); Matthew E. Kulick, San Francisco, CA (US); David Yen, Plano, TX (US)

(73) Assignee: Google Inc., Mountain View, CA (US)

( * ) Notice: Subject to any disclaimer, the term of this patent is extended or adjusted under 35 U.S.C. 154(b) by 159 days.

(21) Appl. No.: 13/735,178

(22) Filed: Jan. 7, 2013

Related U.S. Application Data

(60) Provisional application No. 61/584,709, filed on Jan. 9, 2012.

(51) Int. Cl.
*G06F 7/00* (2006.01)
*G06F 17/30* (2006.01)

(52) U.S. Cl.
CPC ................ *G06F 17/30424* (2013.01)

(58) Field of Classification Search
None
See application file for complete search history.

(56) References Cited

U.S. PATENT DOCUMENTS

| | | | | |
|---|---|---|---|---|
| 2008/0243830 A1* | 10/2008 | Abhyanker | ....... | G06F 17/30696 |
| 2008/0253559 A1* | 10/2008 | Chao | ................. | G06F 21/6218 |
| | | | | 380/28 |
| 2011/0035329 A1* | 2/2011 | Delli Santi | ........... | G06Q 30/02 |
| | | | | 705/347 |
| 2011/0219441 A1* | 9/2011 | Garg et al. | ........................ | 726/9 |
| 2012/0041849 A1* | 2/2012 | Blumenthal et al. | ......... | 705/27.2 |
| 2012/0130969 A1* | 5/2012 | Wong et al. | .................. | 707/706 |
| 2012/0239646 A1* | 9/2012 | Bailey et al. | .................. | 707/733 |
| 2013/0060744 A1* | 3/2013 | Roychoudhuri | .. | G06F 17/30867 |
| | | | | 707/706 |

FOREIGN PATENT DOCUMENTS

EP            2672403 A1     12/2013
WO   WO2004090754 A1      10/2004

OTHER PUBLICATIONS

"How to Disable Google's Personalization of Search Results," Sep. 18, 2010 [online][Retrieved on Jun. 10, 2014]; Retrieved from the Internet URL: http://www.makeuseof.com/tag/disable-googles-personalization-search-results/, 5 pages.

* cited by examiner

*Primary Examiner* — Tuan A Pham
(74) *Attorney, Agent, or Firm* — Fish & Richardson P.C.

(57) ABSTRACT

Techniques for customizing search may include the following operations: outputting, to a computing device of a user, a Web page that enables selection of signals that are usable to generate search results; during a search session, receiving, through the Web page, a query and a selection corresponding to one or more of the signals, where the selection differs from a default set of search signals used by the search system for searching; obtaining, for output to the computing device, search results that are based on the query and the selection; and following the search session, configuring the search system to use the default set of search signals for searching.

16 Claims, 10 Drawing Sheets

FIG. 7

CUSTOMIZING SEARCH

CROSS-REFERENCE TO RELATED APPLICATION

Priority is hereby claimed to U.S. Provisional Application No. 61/584,709, which was filed on Jan. 9, 2012. The contents of U.S. Provisional Application No. 61/584,709 are hereby incorporated by reference into this disclosure.

BACKGROUND

This disclosure relates generally to customizing search by enabling selection of one or more signals for use in searching.

Search engines provide information about resources (e.g., Web pages, images, text documents, and multimedia content) that are responsive to users' queries. A search result may include, for example, a Uniform Resource Locator (URL) and a snippet of information for a resource responsive to a query. Search results may be ranked according to scores assigned to the search results by a scoring function. The scoring function generates the scores for the search results according to various signals, for example, where and how often query terms appear in the search results and how common the query terms are in the search results.

A user may give more weight to search results that are associated with reviews, opinions, or other content associated with a user's social graph (e.g., contacts of the user). A user's social graph can be based, in part, on social networks to which the user subscribes. Signals based on a user's social graph may be used to affect the retrieval, scoring, and display of search results.

SUMMARY

Techniques for customizing search may include the following operations: outputting, to a computing device of a user, a Web page that enables selection of signals that are usable to generate search results; during a search session, receiving, through the Web page, a query and a selection corresponding to one or more of the signals, where the selection differs from a default set of search signals used by the search system for searching; obtaining, for output to the computing device, search results that are based on the query and the selection; and following the search session, configuring the search system to use the default set of search signals for searching. The foregoing techniques may include one or more of the following features, either alone or in combination.

The foregoing techniques may also include determining that the search session has ended. Determining that the search session has ended may include determining that a browser instance associated with the Web page has closed. Determining that the search session has ended may include determining that the search session is over and that a new search session has begun. Determining that a new search session has begun may include identifying that the query has changed and/or determining that a time period between receipt of the query and receipt of another query exceeds a predefined time period.

The one or more signals may include at least one of: a social signal, a geographic signal, and a language signal. The techniques may also include outputting, along with the search results, code to generate an option for displaying search results that are based on the default set of search signals. Following the search session, the search system may be configured automatically to use the default set of search signals for searching.

Between receipt of the selection and an end of the search session, the search system always uses the selection corresponding to one or more of the signals when obtaining search results in response to a query.

Techniques for customizing search may include the following operations: receiving a query from a computing device of a user during a search session; obtaining search results based on the query, where the search results identify first content that is independent of social signals associated with the user and second content that is influenced by social signals associated with the user; making a determination, based on a setting associated with the search session, about whether to output, to the computing device, the first content or the second content as part of the search results; and outputting the search results based on the determination. The foregoing techniques may include one or more of the following features, either alone or in combination.

The search session may be a first search session, and the techniques may include detecting a second search session and reverting the setting to a default setting in response to detecting the second search session, where the default setting is for including, in search results, content that is influenced by social signals.

The setting may indicate whether to output the second content as part of the search result. The techniques may include detecting a second search session. In the first search session, the setting may indicate to exclude, from search results, content that is influenced by social signals; and, in the second search session, the setting may be changed to include, in search results, content that is influenced by social signals as part of search results. Detecting the second search session may include determining that a browser instance associated with the second search session has opened. Detecting the second search session may include determining that the first search session is over and that the second search session has begun. Determining that the first search session is over and that the second search session has begun may include identifying that the query has changed and/or determining that a time period between receipt of the query and receipt of another query exceeds a predefined time period.

The social signals may include signals indicating an affinity of the user to one or more members of a social graph of the user. The techniques may include outputting, along with the search results, code to generate an option for displaying the first content exclusively or the second content exclusively.

Advantages of the foregoing techniques may include allowing users to select signals, e.g., social signals, for use in searching. For example, a user may choose not to receive search results that are based on social signals. Following a current search session, the searching system may revert to a default setting in which, e.g., search results based on social signals are returned to the user. As a result, the user may be relieved of having to reset the search system to its default state every time that the user customizes the search settings, thereby improving an efficiency of searching.

Furthermore, in some examples, search results may be customized using various signals (e.g., language, geography, and so forth). In some situations, when a searcher sees customized search results that are more personalized, e.g., results from social contacts, it may not fit the searcher's established view that search results are unbiased (e.g., are not customized). This is known as cognitive dissonance. So, when a searcher experiences an adverse reaction as a result of this cognitive dissonance, the searcher may want the ability to undo whatever caused their original view to be refuted. The ability to exclude search results generated using social signals may ease the searcher into a new search experience (e.g., a search experience that includes social signals), and thereby, over time, allow the searcher to recalibrate their view that search results can be personalized and still be relevant. Aspects of the processes described herein, e.g., reverting to a default setting where social signals are part of search and/or providing searchers with information about additional content available by allowing social (or other) signals to be part of the search, thus may promote acceptance of a more personalized searching paradigm and mitigate aversion to change.

Aspects of the processes described herein may also help to maintain brand perception. For example, people may experience cognitive dissonance about what a brand (e.g., a search brand) means to them. In this regard, people identify with the brands they use, so when a brand changes, that change can causes a change in a person's own self-image. As noted above, aspects of the processes described herein may help to ease the effects of such changes.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIGS. 7 and 8 are examples of Web pages showing search results that are independent of social signals.

Like reference symbols in the various drawings indicate like elements.

DETAILED DESCRIPTION

Figure 1:
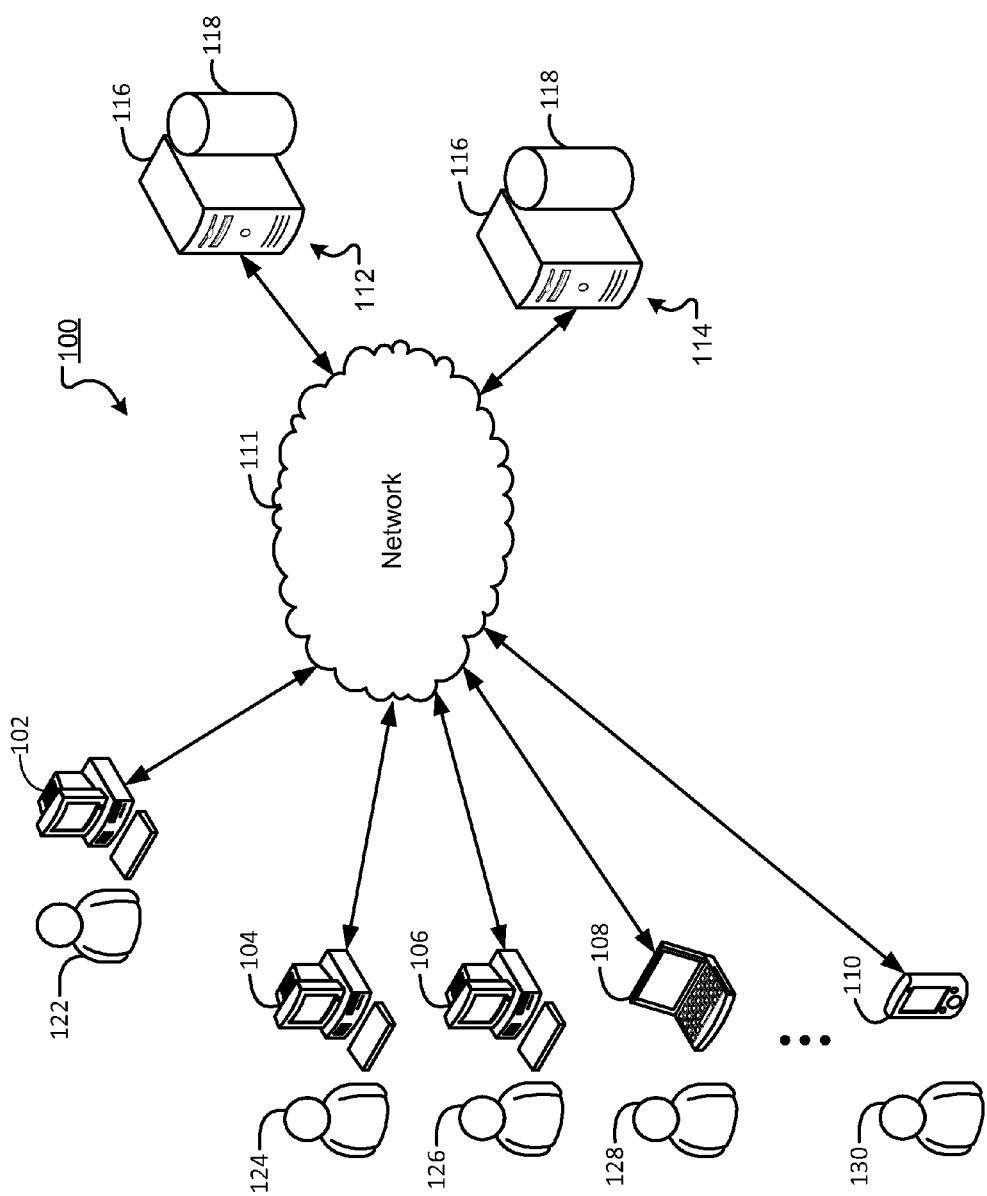
FIG. 1 is a block diagram showing an example of a network environment on which the process described herein may be implemented.

Described herein are techniques for customizing search by enabling user selection of one or more signals for use in searching. For example, a Web page hosted by a search system may have an option to either include or exclude search results that are obtained based on social signals. In this context, a social signal may include, but is not limited to, a signal that indicates an affinity or other social connection between two members of a social graph.

During a search session, a user accesses the foregoing Web page, and inputs a query into a search field of the Web page. The search system (e.g., a search engine) may have a default setting, according to which the search system performs searching using certain signals—in this example, social signals, among others. The user, however, may modify that setting through the option on the Web page so that the search results obtained are independent of social signals.

During the search session, the search system performs a search of one or more search indexes to obtain search results corresponding to the input query. The search system may take into account the social signals when searching, and thereby identify search results that relate to the social signals. For example, the search system may identify members of the user's social graph who have recommended, shared or endorsed certain search result content. If the user has retained or selected the search system's default setting (e.g., in which social signals are taken into account during search), social information relating to search result content may affect which search results are obtained and how they are presented. If the user has changed the default setting—in this example, so that social signals are not taken into account during search—the search system outputs search results that are independent of the social signals.

If the default setting has been changed by a user during a search session, the system may revert to its default setting after expiration of the current search session and/or upon initiation of a new search session. For example, in a case where the default setting is to include, in output, search results that are based on social signals, the search system may revert to this functionality in a new search session without further input from the user. Whether a search session is new or continuing may be determined in a number of ways, as described below.

In some examples, the default setting may be changed through an on-page control feature, e.g., a check box. As a result, searchers are not required to permanently change their search settings, e.g., by logging out of the search system. Such features can be advantageous in a search context. For example, a searcher may have an adverse reaction to changes in search result content, e.g., the inclusion of social information in the search results. In response, a searcher may attempt to disable such features. However, doing so could require the searcher to log-out of the search system and, as a result, not maintain advantages of a logged-in user. Furthermore, upon changing the settings, the searcher may forget to log back in. While this type of more permanent setting change remains an option, the features described herein provide mechanisms for searchers to temporarily disable searching based on certain signal(s), whereafter (e.g., upon detection of a new search session) the system reverts to a default mode in which those signals are used. As a result, the searcher is not required to log out of the search system, but still has a mechanism for controlling how searching is conducted. Furthermore, features described herein provide the searcher with information about how certain signals (e.g., social signals) can enhance the search experience. As a result, searchers may become accepting of that type of searching over time.

Although, social signals are used primarily in the examples described herein, other signals may be used in place of social signals. For example, the search system default may be to use geographic (e.g., global positioning system) signals when searching and presenting search results. A search home page may include a setting to ignore such signals when searching and/or reporting search results back to the user. In another example, the search system default may be to use language (e.g., French, English, Arabic, etc.) signals when searching and presenting search results. The search home page may include a setting to ignore such signals when searching and/or reporting search results back to the user. Other appropriate setting and signals other than these may be used.

The search system default may be to use search history signals as well. For example, search results may be personalized based on user interests, as revealed through the "context" of past queries and clicks. For example, a "pattern" (which site are generally visited for a given topic) and "preference" (which topics are of interest) may be used to customize search results. For example, if one is a farmer who frequently visits Web sites about apple varieties and farming techniques, the search system may be more likely to show results about apples the fruit rather than Apple computers. If a user is not logged-in to the search system, search results may be customized based on up a number of days of past search information linked to a browser using an anonymous cookie. Search results that are based on search history may be turned-off in the manner described herein, e.g., through a check box on a Web page or through more permanent settings.

The techniques described herein may be implemented in an appropriate network system, with appropriate devices and computing equipment. An example of such a network system is provided below.

FIG. 1 is a block diagram showing an example of a network environment on which the techniques described herein may be implemented. FIG. 1 shows example network environment 100. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102 to 110 enable respective users 122 to 130 to access and to view documents, e.g., Web pages included in Web sites. For example, user 122 of computing device 102 may view a Web page using a Web browser. The Web page may be provided to computing device(s) 102 to 110 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102 to 110 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Figure 2:
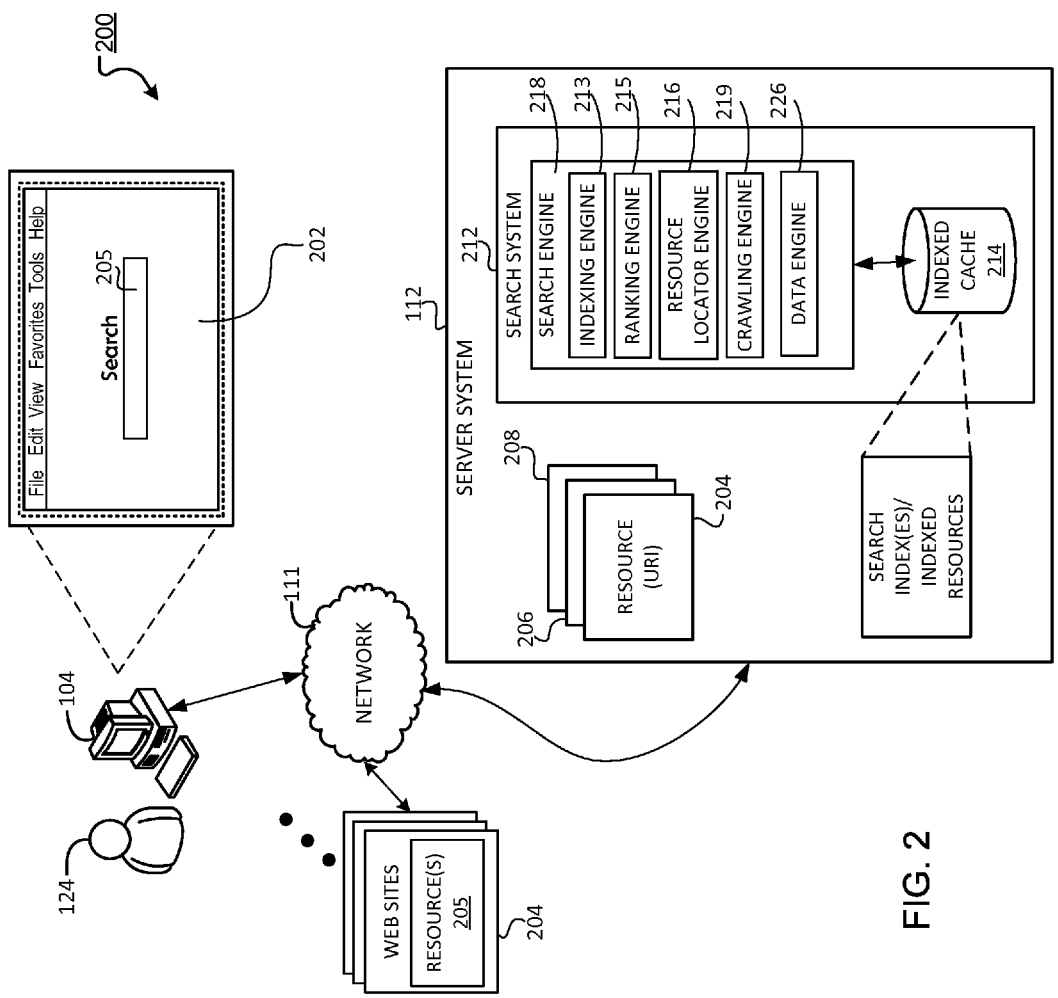
FIG. 2 is a block diagram of an example part of the network environment of FIG. 1.

FIG. 2 is a block diagram of an example part of the network environment of FIG. 1. Specifically, FIG. 2 shows portion 200 of example network environment 100. In this example implementation, server system 112 stores a plurality of resources 204, 206, 208. A resource has an associated resource identifier (Resource ID). For example, resources 204, 206, 208 may correspond to different Web pages of the same Web site, or may correspond to Web pages of different Web sites. As explained below, in this example operation, computing device 104 communicates with server system 112 to display a home Web page ("home page") 202 of a search engine Web site.

To view a Web page, user 124 may input or select a Resource ID using a browser that is executed on computing device 104. The Resource ID may include, for example, a uniform resource indicator (URI) or a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be home page 202, through which a user may access search system 212. The home page may include a field 205 for inputting a search query that is transmitted to the search system. The search query may include, e.g., one or more terms (e.g., text), images, audio, video, or other content. In response, the search system performs a search of an indexed cache containing one or more search indexes, and returns a search results list to a user. The search results list may include, e.g., links to content that is deemed relevant to the search terms.

Search system 212 may be implemented, e.g., on server system 112 as shown or on other appropriate hardware. Search system 212 includes a search engine 218 and one or more search indexes. Search system 212 identifies resources 205 (e.g., Web pages, images, news articles, user-generated content, social information, or other public or private resources) provided by content publishers on Web sites 204 or elsewhere. Search system 212 include a crawling engine 219 to crawl those resources, and an indexing engine 213 to index those resources in one or more search indexes (referred to collectively as a "search index") stored in memory, e.g., in indexed cache 214. Search engine 218 also includes a resource locator engine 216 for identifying resources within the search index that are responsive to, and that may be relevant to, the query (for example, by implementing a query text matching routine). A ranking engine 215 ranks resources deemed relevant to the search query for output to computing device 104.

Social graph information may be included in a same search index as other resources or in a separate search index (not shown). As described in more detail below, social graph information may include, e.g., comments, endorsements, connections, affinities, and so forth related to indexed content and to a user's social graph. A separate search may be performed for general search results responsive to a query, as well as particular search results that identify resources associated with the user's social graph (e.g., endorsed Web content).

In some implementations, information associated with the user's social graph may be indexed by generating and incorporating suitable data structures, e.g., social restricts, in an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

In response to a search query, search engine 218 may access indexed cache 214 to identify resources 205 that are relevant to the search query. Resource locator engine 216 identifies resources 205 in the form of search results for return to a requesting device in search results pages. A search result may include data generated by search system 212 that identifies a resource 205, and that includes a link to the corresponding resource, along with images, video, or other appropriate content. An example search result may include a Web page title, a snippet of text or a portion of an image extracted from the Web page, and the URL of the Web page. In some cases, the search results may also include social information. For example, included with some of the search results may be comments, endorsements, or other information obtained about the search results from a user's social graph. The social information may also be used to affect retrieval, ranking, and display of the search results, as described below.

In this regard, search system 212 may, or may not, take into account social connections that the user has to others when obtaining and presenting search results to the user. For example, a user's connection to another party may affect, e.g. the ranking and display of search results, as described herein. To this end, search system 212 includes a data engine 226 that is programmed to identify a setting received from a Web page indicating which signal(s) are to be taken into account during searching. Data engine 226 may filter search results based on those signals, and provide the appropriate search results to the user's computer.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graphs to one or more other social graphs. Thus, a social graph may include a single social graph or multiple interconnected social graphs.

Users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a Web browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from oneself or others may be captured in a user's social graph. Information from oneself may include, e.g., content that the searcher has himself or herself generated, and that may be relevant to the search queries described herein. The content that the searcher has generated may include, e.g., public content (e.g., blogs, posts, articles, and so forth) and private content (e.g., social network posts, electronic messages, and so forth).

Affinity between entities of a social graph may be represented by the above-noted edges in the user' social graph. In this context, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific. For example, social graph data may identify specific types of content associated with an edge between parties and specific affinities for that content. For example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about surf boards and a second, different level of affinity for the second party's content about recipes.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

In other examples affinity may be defined by physical proximity as determined by how often two parties' mobile devices (e.g., cellular telephones) are in the same location at the same time relative to how many others' devices are in that same place. How often parties call or send electronic messages to each another is another example of how to identify an affinity between two parties. Features may be provided by which users enable or disable, respectively, systems to identify the locations of their mobile devices.

Figure 3:
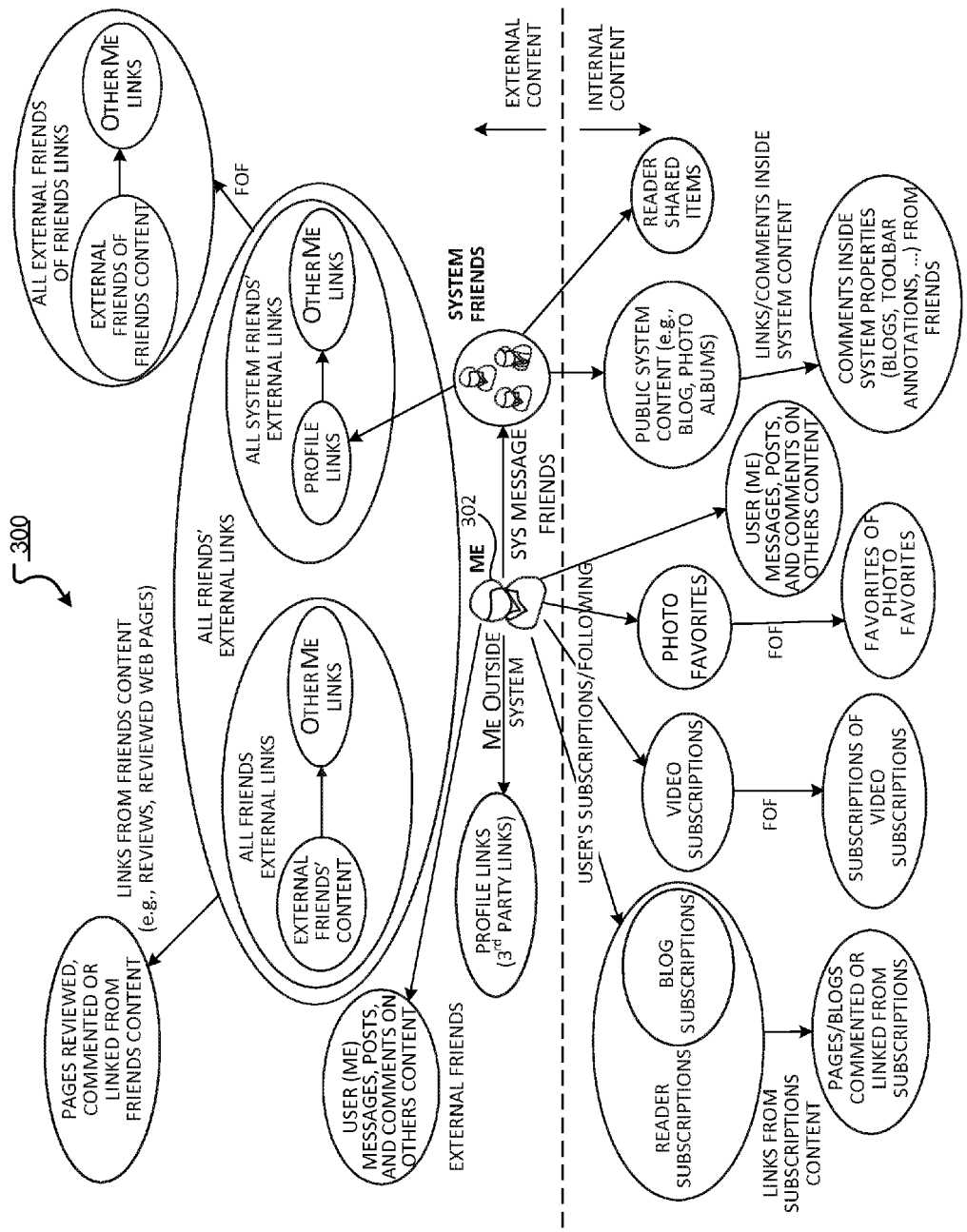
FIG. 3 a conceptual view of an example of a social graph.

FIG. 3 is a conceptual view of an example social graph 300. Among other things, FIG. 3 shows sources of information for a social graph. In this example, the user's social graph is a collection of connections (e.g., users, resources/content, etc.) identified as having a relationship to the user 302 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 3 shows that it is possible to extend the user's social graph to people and content both within a single network and across one or more external networks. For example, the user may have a profile or contacts list that includes a set of identified contacts, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profile that includes connections to resources as well as contacts of the respective contacts. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index database in the indexed cache 214 of FIG. 2. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

It is noted that a user may prevent addition of members to the user's social graph, e.g., using an available feature or by keeping contacts out of particular groups used to generate the social graph. In some implementations, privacy features provide a user with an option to allow or to prevent, respectively, being included (or removed the user if already included) as a member of another's social graph. Thus, users may have control over what personal information or connection information, if existing, is included in their social graphs and, consequently, that may be included in search results pages.

Figure 4:
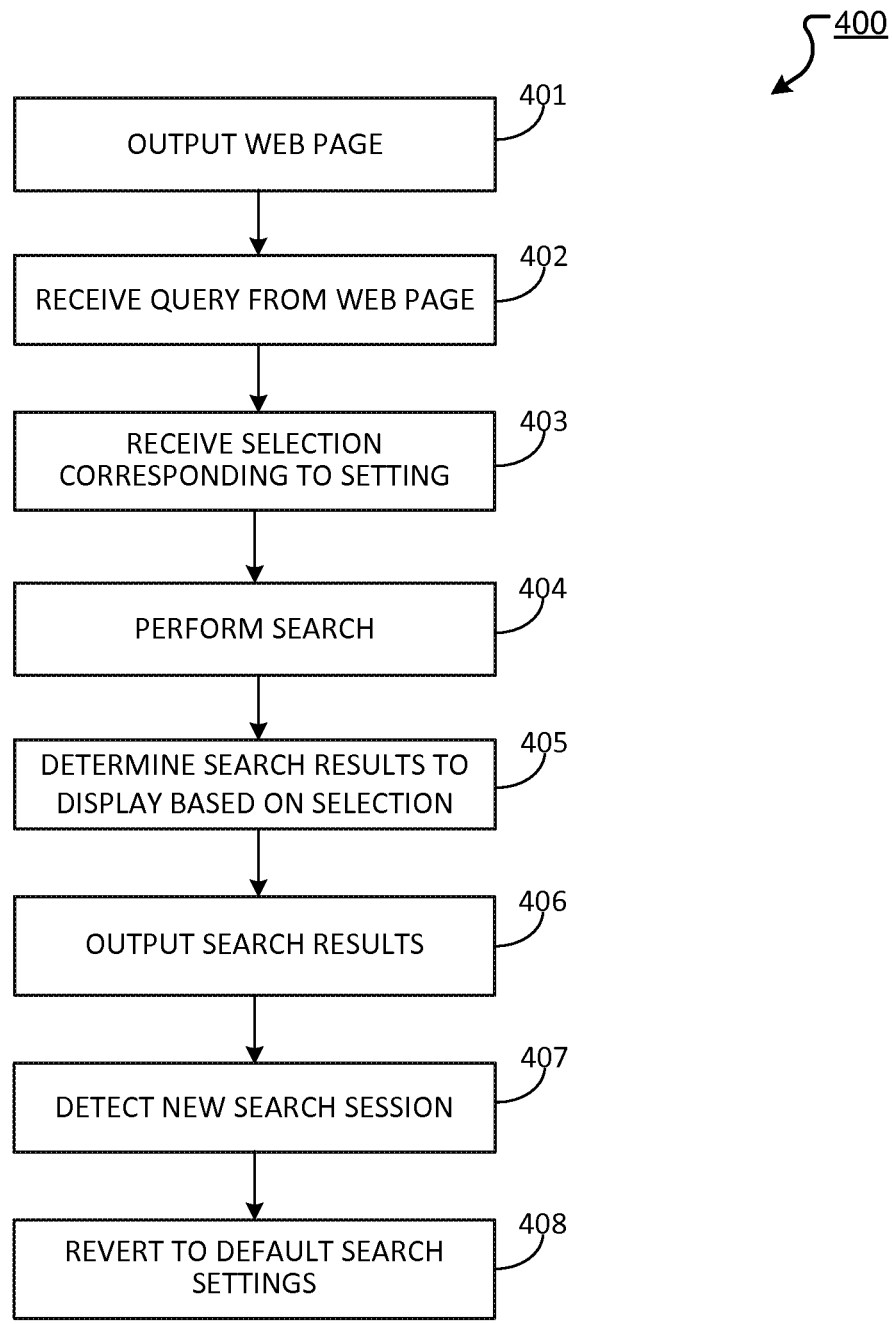
FIG. 4 is a flowchart showing an example of a process for customizing searching by enabling selection of one or more signals.

FIG. 4 is a flowchart of an example process 400 that may be performed by search system 212 on the network environment of FIGS. 1 and 2 and that may be used to customize searching by enabling selection of one or more signals.

Figure 5:
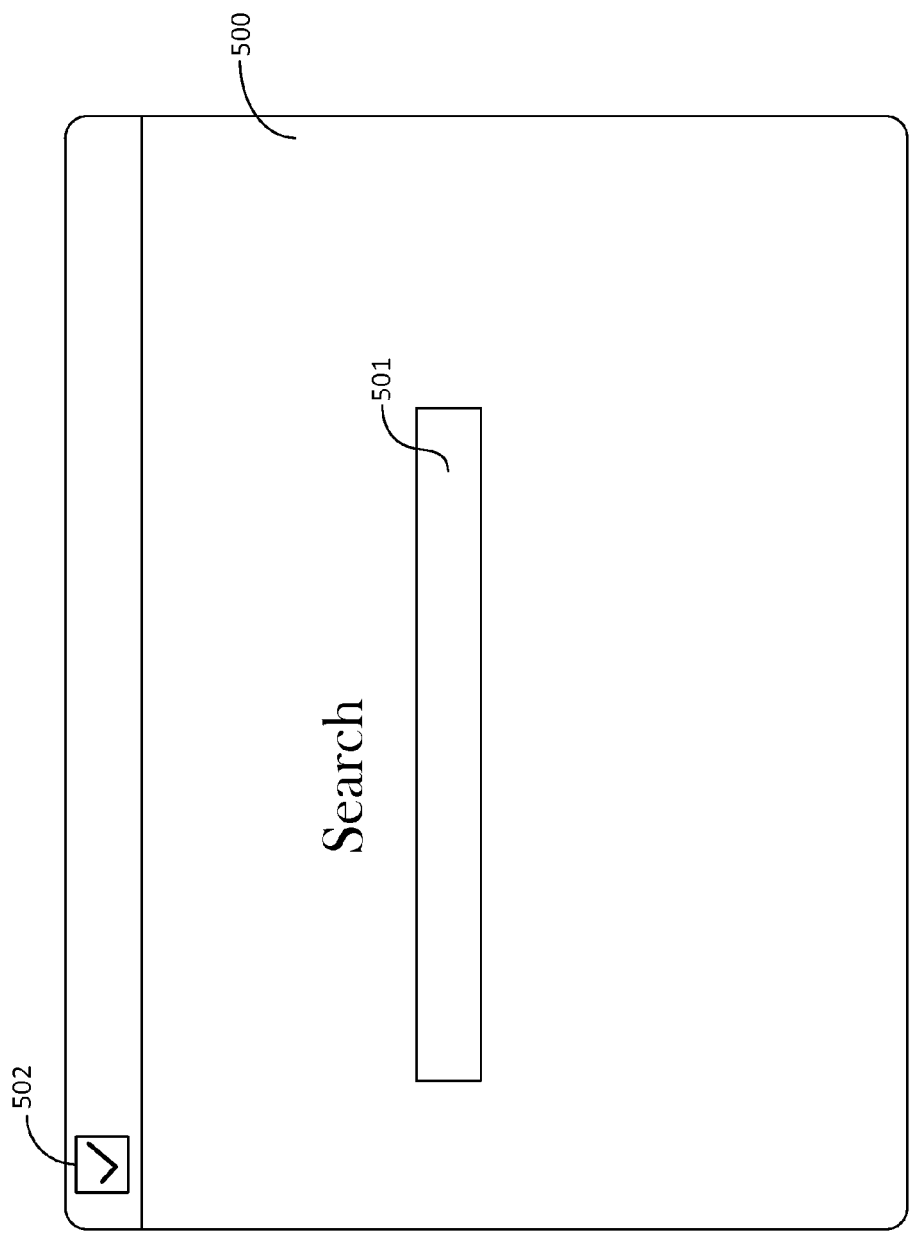
FIG. 5 shows an example of a Web page for receiving a search query.

In response to a request, process 400 outputs (401) a Web page to a user's computer. An example of such a Web page 500 is shown in FIG. 5. Web page 500 includes a field 501 for receiving search query content (e.g., text, images, video, audio, and so forth) to be provided to search system 212. In this example, search system 212 has a default setting in which it is configured to operate using social signals, and to output search results that include social content. However, through appropriate selection on Web page 500, search system 212 may be configured to output search results that are independent of social (or other) signals, e.g., that do not take into account information from the user's social graph (or elsewhere) when identifying and outputting search results. To this end, Web page 500 includes an option 502 for use in selecting one or more signals to use in the search. In this example, option 502 enables the user to configure search system 212 to search for, or not to search for, social content, and to use, or not to use, that social content to affect output and/or presentation of search results corresponding to the input search query. In this example, the option is expressed using a check box; however, other mechanisms may be used. In the default mode (shown), a check is placed in the check box.

Process 400 receives (402) a query input by the user into Web page 500. Process 400 also receives (403) a selection signal indicating whether a type of signal (e.g., social signals) is to be used in outputting search results. The input query, either alone or in combination with the selection signal, may constitute the beginning of a current search session. The selection signal corresponds to whether the default mode has, nor has not, been selected by the user on Web page 500. In some implementations, regardless of the setting (default or not default), social signals may still be used by search system 212 in performing the actual search. However, if the setting indicates that social results are not to be included in search results, search results that are determined based on the social signals are not included in the search system output. However, an indication may be provided on the search results Web page indicating specifically how those social search results may enhance the "independent" search results (e.g., how many social contacts have knowledge of the search subject matter). An option may also be provided, on the Web page, to view the social search results, e.g., by refreshing the Web page. In other implementations, if the default mode is not selected, e.g., if the user does not want searching performed based on social signals, search system 212 does not use social signals in performing searching.

Process 400 performs (404) a search of indexed cache 214 using the input query and appropriate signals, e.g., social signals. For example, process 400 may generate a relevance score for content items in the search index based on how closely those content items match the input query. That relevance score may be influenced by a social connection of the searcher to the content items. The content items searched may include, e.g., content from social contacts and/or content that the user himself or herself has generated. For example, if a search index includes an entry indicating that one or more contacts on the searcher's social graph has recommended a content item, the relevance score for that content item may be adjusted to indicate a greater degree of relevance to the input search query than if there were no social connection to the content item. This may also occur, e.g., if contacts on the searcher's social graph, e.g., shared the content item, endorsed the content item, regularly interact with (e.g., view) the content item, authored the content item, are knowledgeable about the subject matter of the content item, or have another connection to the content item on the searcher's social graph. In some cases, including social signals in a search may affect the relevance scores of certain content items to the extent that those content items are, or are not, included in the search results. For example, if members of the user's social graph have commented negatively about a content item, and such information is available to the search system, the relevance score of that content item may be adjusted so that the content item is not included in the search results Also, as part of the search of the indexed cache, process 400 may retrieve indexed information from members of the user's social graph (including content from the searcher) that is relevant to a content item. For example, process 400 may retrieve comments about the content item, endorsements of the content item, and so forth. Process 400 may also keep track of numbers of times members of the searcher's social graph have interacted with, or otherwise related to, the content item. For example, process 400 may track that a certain number of the searcher's contacts have recommended the content item, and incorporate this information into the search result output.

As noted above, the searching that is performed (404) above may take into account available signals (e.g., social signals) regardless of the setting that has been selected on the search Web page. The search system, however, may maintain different search result sets, or at least be able to identify which search results take into account available signals and which do not. This can useful in presenting search results to the searcher. For example, if the searcher has elected not to use social signals during search, process 400 may determine (405) to output, to the searcher, data for a search result set that is independent of social signals (e.g., that is determined based on input search terms without regard to contacts on the searcher's social graph). However, the data that is output may also contain information identifying, e.g., how the inclusion of social signals in the search may enhance the search result set. This information may be obtained, e.g., based on a search conducted using the social signals. So, for example, if search results are output that are independent of social signals, the resulting display may include, e.g., an indication that additional search results and/or other information may be available by allowing social signals to be part of the search. Thus, this notification provides the searcher with some indication that greater value can be obtained from the search by allowing social (or other) signals to be incorporated into the search. The searcher may be provided with an option to refresh the search results and, thereby, include search results that are based on social signals. In other implementations, this information and option is not provided.

Process 400 determines (405) which search results to output based on the setting selected by the searcher. For example, if the searcher has elected not to use social signals in searching, process 400 determines (405) to output (406) search results that are independent of social signals. In this case, the search results may be ranked according to their relevance scores and, other appropriate information, e.g., geography, demographics, time of year, and so forth. If, however, process 400 determines (405) to output (406) search results that take social signals into account, social signals may also affect the ranking score of the search results. For example, ranking engine 215 may take into account social affinities that the user has to others or to the search result content when ranking the search results. For example, a user's affinity to another party may be used to adjust (e.g., increase or decrease) the ranking score of search results related to that party.

In some examples, the subject matter of the content may influence the relevance score and/or the ranking score. For example, if a member of the searcher's social graph is an expert in a particular field (as determined, e.g., by publications, user profile entries, comments, and so forth), the ranking and relevance scores of content associated with that member may be adjusted to indicate greater relevance for that content than would otherwise be the case. Similar adjustments may be made, e.g., if the search system is able to ascertain (e.g., through profiles, search behavior, and so forth) that the searcher trusts the member's opinion about certain subject matter, but not about other subject matter. For example, if the searcher trusts a member's opinion about surf boards, then the relevance and ranking scores of content related to surf boards and associated with that member may be adjusted to indicate greater relevance for that content than would otherwise be the case. Similarly, if, for example, the searcher does not trust that same member's opinion about recipes, then the relevance and ranking scores of content related to recipes and associated with that member may be adjusted to indicate less relevance for that content than would otherwise be the case.

Figure 6:
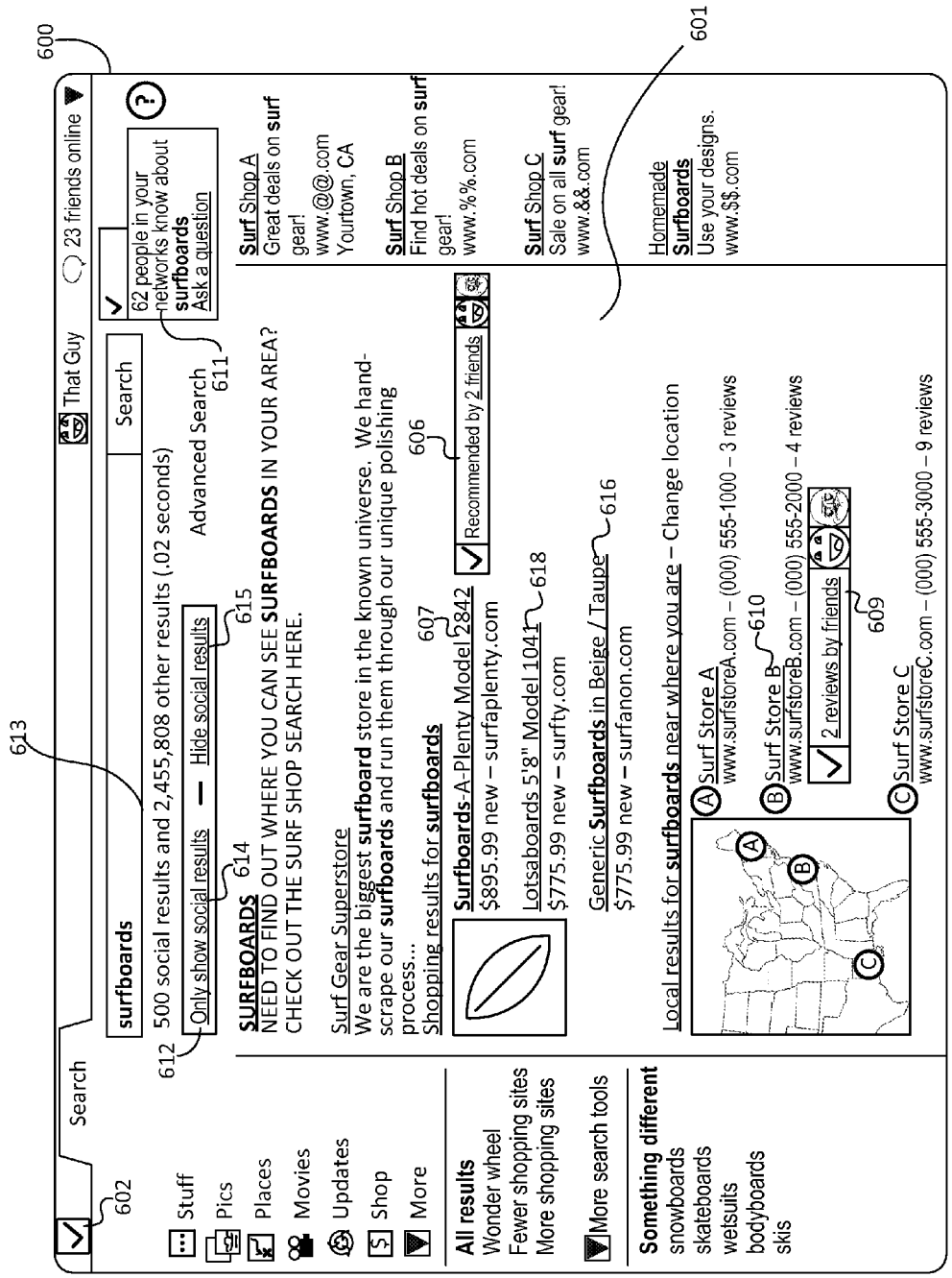
FIG. 6 shows an example of a Web page showing search results that were obtained by taking into account one or more social signals.

Process 400 outputs (406) data for the ranked search results to the searcher's computing device. The searcher's computing device receives the data and uses the data to render a Web page showing the search results. FIG. 6 shows an example of a Web page 600 showing search results 601 that were obtained by taking into account one or more social signals. As shown in FIG. 6, check box 602 is selected to indicate that social signals affect the search results. As noted, the social signals may affect the actual search results that are displayed (e.g., the relevant content) and the way in which the search results are displayed (e.g., their ranking or order of display). Web page 600 displaying search results that are based on social signals may also be highlighted with a particular color to provide a relatively prominent indication to the searcher that the search results are based on particular signals, e.g., social signals.

Social information may also be displayed on Web page 600, either apart from, in association with, corresponding search results. For example, notice 606 indicates that search result 607 was "Recommended by 2 friends" (e.g., contacts on the user's social graph). A link may also be provided that can be selected to obtain the friends' profiles. Pictures of the friends who provided the recommendations may also be displayed. Likewise, notice 609 indicates that search result 610 was "Reviewed by 2 friends", and an appropriate link and/or pictures may be provided. Option 611 specifies the number of people in the user's social networks who have knowledge about the search subject, and offers an option to ask a question about the search subject. In some implementations, an icon (e.g., a person) may be displayed next to, or otherwise in association with, individual social search results to designate them as such.

In the example of FIG. 6, search results that are based on social signals and search results that are independent of social signals are both shown. The number 613 of each type of search results may also be displayed, as shown in FIG. 6 (e.g., 500 social search results and 2,455,808 other, e.g., non-social, results). Notice 612 provides, to the user, an option 614 to show search results whose relevance and rankings are based primarily on social signals ("Only show social results"). In this example, content for which there is no social connection to the searcher may be excluded altogether from the search results. Notice 612 also provides the user with an option 615 to see search results that are independent of the social signals (e.g., to hide, or not display, search results that are based on social signals). In this example, the option is a link, although other types of controls may be used. The Web page may also include a prominent notice indicating that the search results are based on social information.

Figure 7:
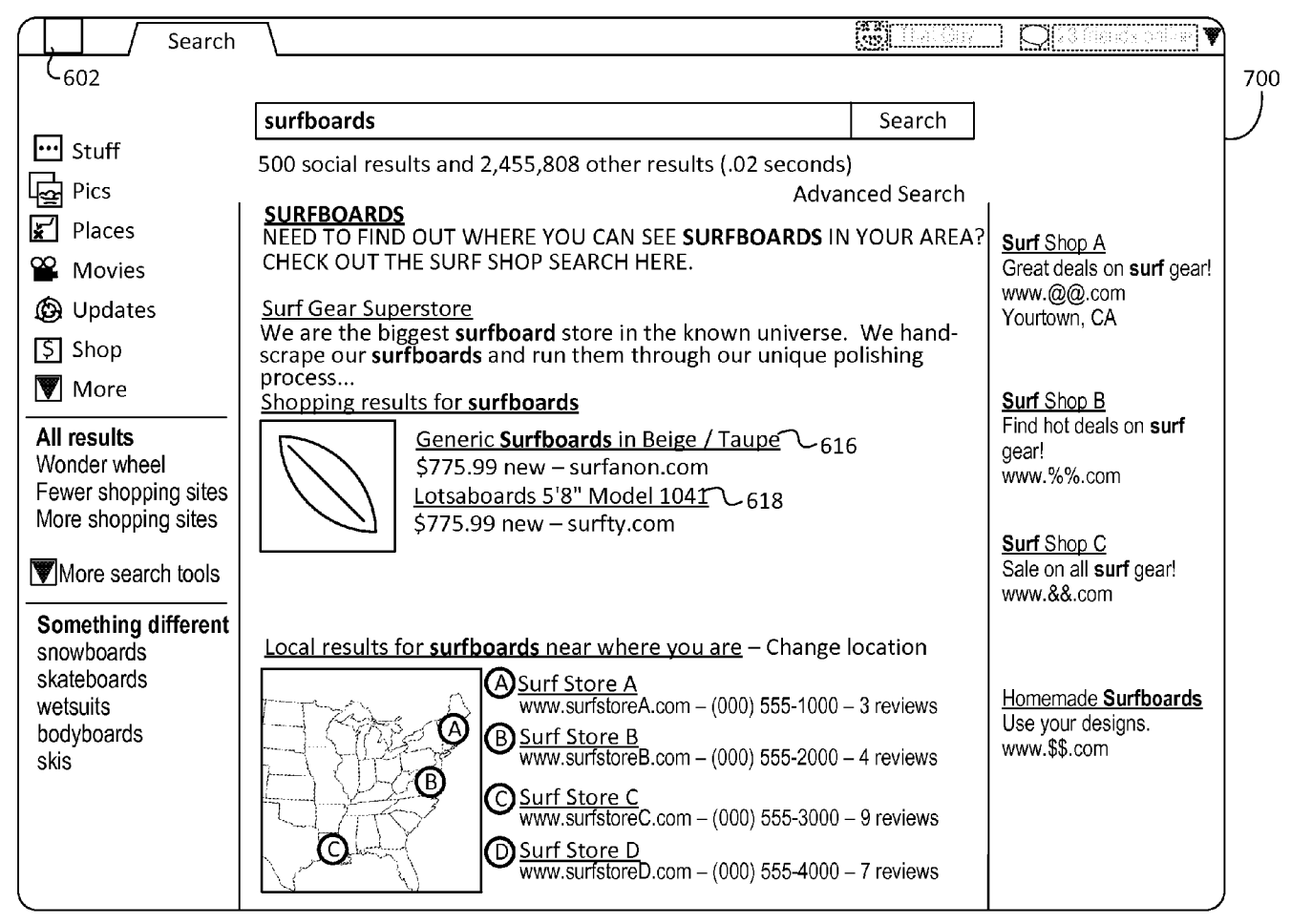

Selection of option 615 instructs search system to provide search results that are independent of the social signals. This instruction may also be sent by de-selecting check box 602. In response to receiving the search results that are independent of the social signals, Web page 600 refreshes, and displays such results. FIG. 7 is an example of a Web page 700 showing search results for the same search query as Web page 600 ("surfboards"), but that are independent of social signals. Referring also to FIG. 6, search result 607 is not shown in the search results of FIG. 7, and search results 618 and 616 in FIG. 6 are displayed in a different order (e.g., ranked differently) from FIG. 7. These differences, in this example, can be attributed to the effect of the social signals on the relevance and/or rankings scores of the content identified by search system 212.

Figure 8:
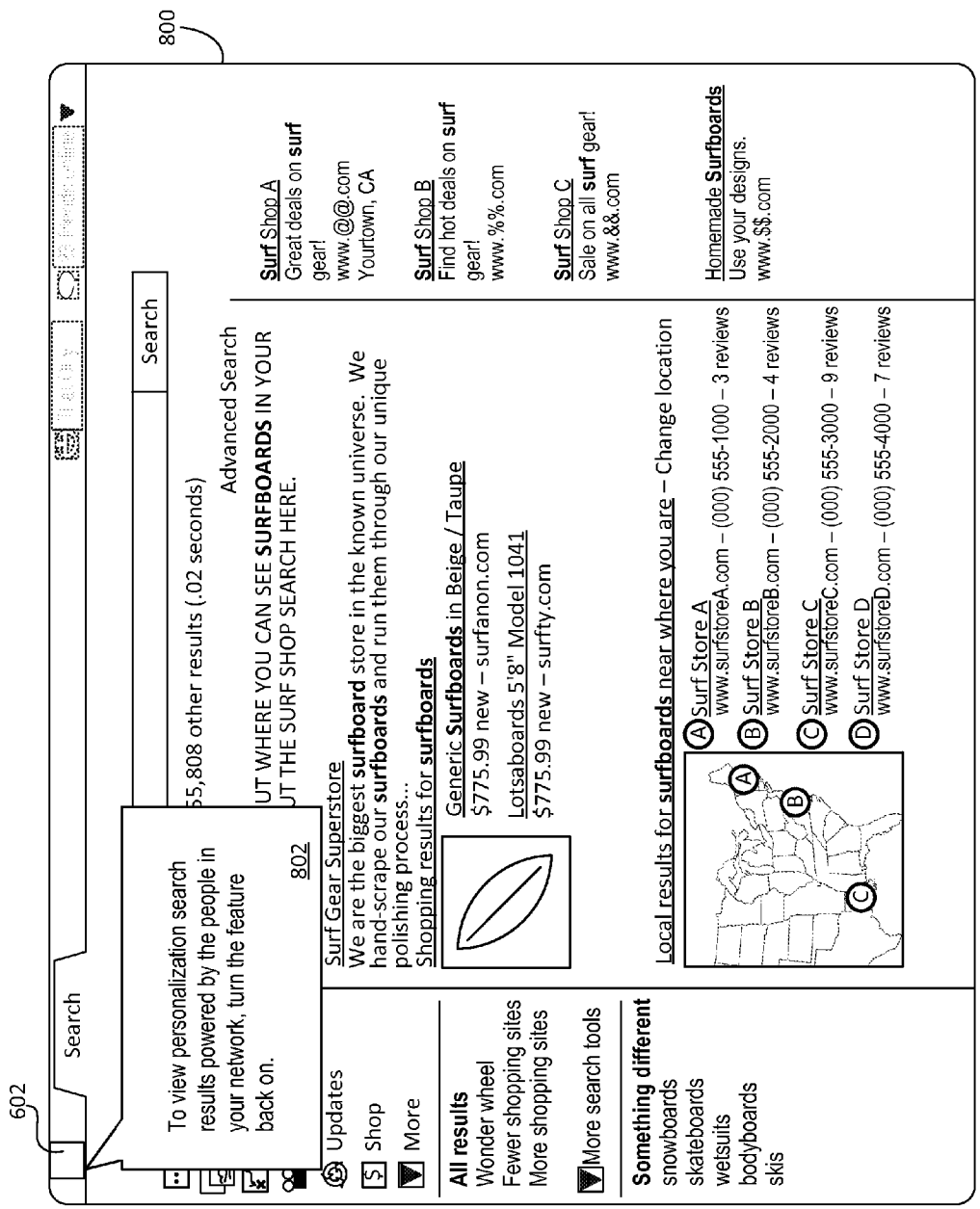

In FIG. 7, the check in checkbox 602 is removed to indicate that it is not selected (and, therefore, that social signals do not affect the search results). FIG. 8 is a Web page 800 that is similar to Web page 700, but shows a pop-up message 802 that may be generated, e.g., by mousing-over check box 602. The pop-up message may prompt the user to select the option to use social signals in the search results. If selected, process 400 may cause the search to be updated, and Web page 800 to be refreshed to include search results that are based on social signals.

Referring back to FIG. 4, if the user has elected not to use social signals in the current search session, in the event that the current session expires or a new session beings, search system 212 may revert to a default setting in which social signals are used as part of the search process. In this regard, it may be advantageous for users to have access to additional information resulting from using social signals in performing the search. Accordingly, in this example, the default is to use social (or other) signals. In other implementations, the default may be not to use social (or other) signals in performing the search.

In a case where the search system is not in the default mode (e.g., if it is instructed not to use social signals), process 400 may determine when to revert to the default mode. For example, process 400 may detect (407) a new search session. The new search session may be detected, e.g., in response to a user opening a new Web browser instance. This may not require closing an existing Web browser instance for which the system is not in default mode. For example, a user may simply open a new tab of a Web browser to indicate a new search session. Information about whether a Web browser instance is new or existing may be tracked using, e.g., one or more browser cookies passed between the Web browser and the search system.

In other example implementations, the new search session may be detected (407) by processes other than identifying a new Web browser instance. Session edge detection techniques may be used. For example, process 400 may detect a new session based on the content of two search queries received in sequence. In this case, for example, search system 212 may make a determination about whether the two sequential queries are related in order to determine whether the second query represents a new search session. For example, consulting the search index to determine the relevance score of one query in relation to another query may be a way of determining if the two queries are similar. If the two queries are similar, or related to similar subject matter (e.g., surf boards and boogie boards), then process 400 may determine that the current search session is continuing, and that a new search session has not begun. On the other hand, if the two queries are dissimilar, or related to different subject matter (e.g., surf boards and recipes), then process 400 may determine that a new search session has begun.

Process 400 may detect that a new search session has begun based, e.g., on the time between search requests, regardless of whether the query terms in the requests are similar. In this example, if the time between two search requests exceeds a predefined time, a new search session will be detected even if the query terms are identical or related (e.g., both queries are for surf boards). The predefined time may be set automatically by search system 212 or it may be set on a user's settings page (not shown). The predefined time may be, e.g., ten minutes, a half hour, an hour, two hours, or other appropriate time period.

Process 400 may detect that a new search session has begun based, e.g., on a combination of the search query similarity and time between searches. For example, for two searches in sequence, weights may be placed on a time between the two searches and a similarity of the query terms. The weights may impart a relative importance to the two factors in determining whether a new search session has begun. For example, the search system may weight similarity of search terms as being twice as important as the time between searches, or vice versa, in determining whether a new search session has begun.

Processes other than those described above may be used to detect when a new search session has begun and, therefore, when process 400 reverts (408) to the default mode (in this case, to include social signals in the search). In this example, the reversion is automatic, e.g., without requiring user action.

As noted above, in other implementations, the signals that are being used, or not used, in the searching process need not be social signals. For example, the processes described herein may be used to customize searching so that one or more other signals are/are not used for searching. For example, the processes may be used to display search results that take user geography (e.g., home location, work location, and so forth) into account when performing the search, and that allow the user to see search results that do not take geography into account. Likewise, similar processes may be used to account for or discount other signals that may affect the content and ranking of search results including, but not limited to, demographics, prior search history, set preferences, and so forth.

Figure 9:
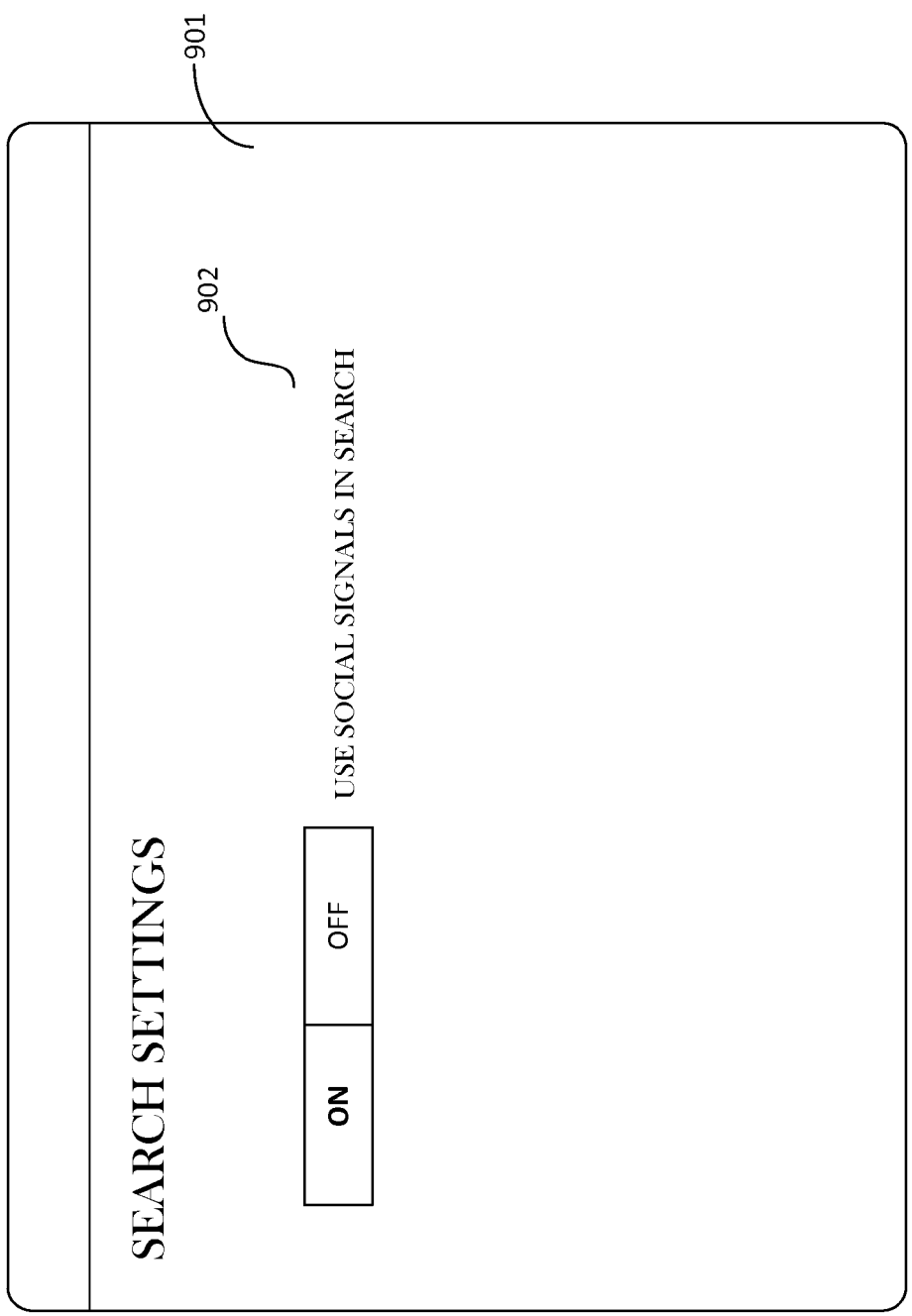
FIG. 9 shows an example search settings page.

The implementations described above have the search system reverting to a default mode following occurrence of a condition, e.g., a new search session. In other implementations, a setting that indicates whether to use certain signals (e.g., social signals) in searching may be more permanent. For example, a user may login to a search system, and access a settings page (e.g., page 901 of FIG. 9) that allows the user to select social signals 902 for use in searching. This setting settings may be maintained until manually changed by the user. Alternatively, the user may select conditions (e.g., times, dates, etc.) under which the settings may change or revert to default settings like those described above. In some implementations, such more permanent settings may be over-ridden through one or more controls (e.g., a check box) on a search Web page.

As noted elsewhere herein, privacy features provide a user with an option to allow or to prevent, respectively, their private content from being included in search results of the type described herein.

Other implementations may involve excluding or including particular content from searching. Such content may include, e.g., images, video, articles, blogs, microblogs, maps, patents, and so forth. Content from specific (e.g., proprietary) sources may also be included or excluded. As above, following a search session, the search system may revert to a default setting.

In some implementations, user interfaces other than check boxes may be used to cause social (or other) search results to be provided and displayed. For example, in an implementation, a person icon (not shown) and a world icon (not shown) may replace check box 602 in FIGS. 6 to 8. Selecting the person icon sends a signal to the search engine that causes retrieval, output and display of social search results. Selecting the world icon sends a signal to the search engine that causes retrieval, output and display of other, e.g., non-social, search results. Selecting both the person icon and the world icon sends a signal to the search engine that causes retrieval, output and display of both the social search and the other (non-social) results. In this context, "social search results" include search results that are affected (e.g., by ranking or otherwise) by social signals, and are not limited to social content, content from social media, or the like.

The features described herein may be combined in a single system, or used separately in one or more systems.

The processes described herein and variations thereof (referred to as "the processes") may contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Figure 10:
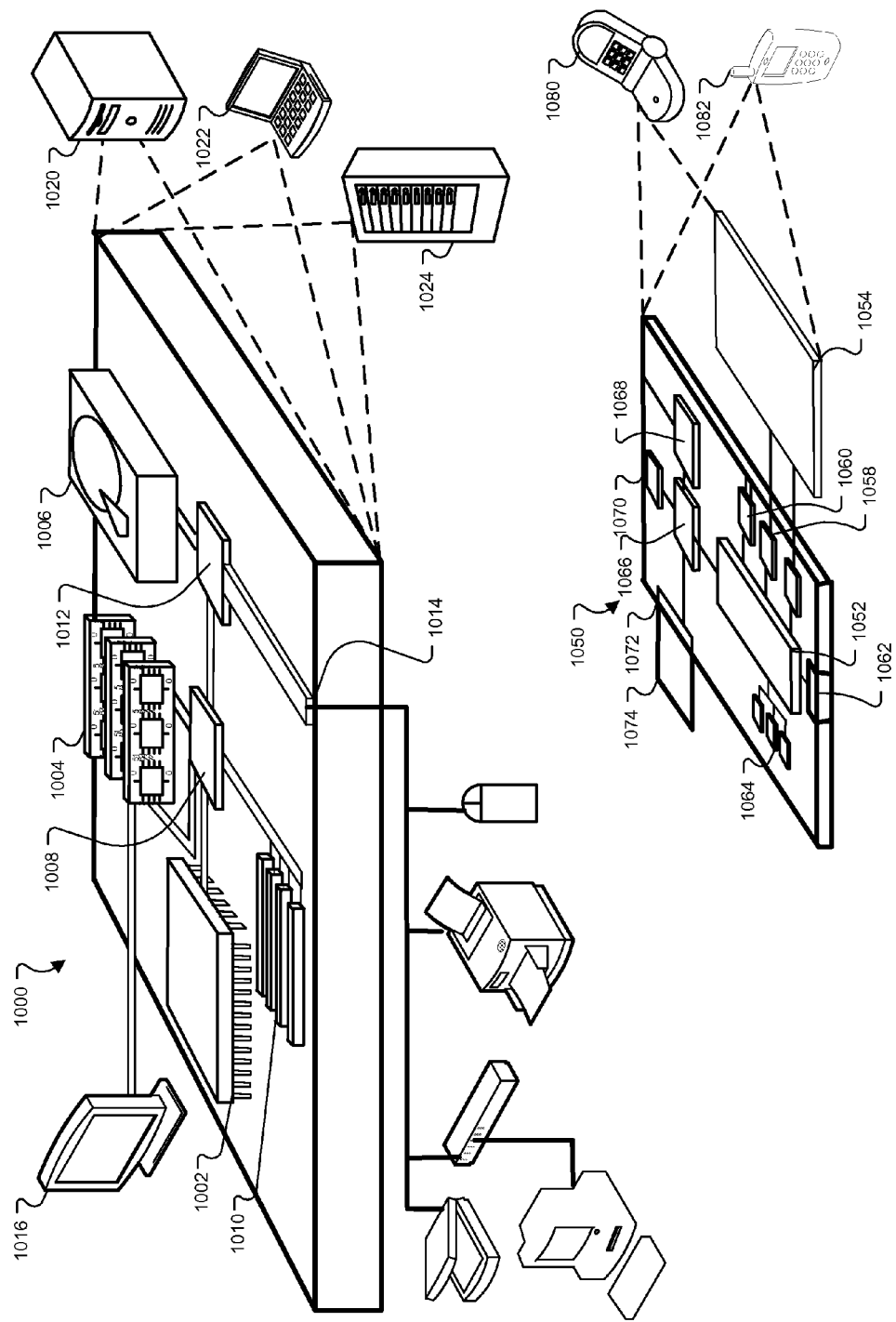
FIG. 10 shows examples of computing devices on which the processes described herein, or portions thereof, may be implemented.

FIG. 10 shows examples of computing devices on which the processes described herein, or portions thereof, may be implemented. In this regard, FIG. 10 shows an example of a generic computing device 1000 and a generic mobile computing device 1050, which may be used to implement the processes described herein, or portions thereof. For example, search system 212 may be implemented on computing device 1000. Mobile computing device 1050 may represent a client device of FIG. 1. Other client devices of FIG. 1 may also have the architecture of computing device 1000.

Computing device 1000 is intended to represent various forms of digital computers, examples of which include laptops, desktops, workstations, personal digital assistants, servers, blade servers, mainframes, and other appropriate computers. Computing device 1050 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, for example, display 1016 coupled to high speed interface 1008. In other implementations, multiple processors and/or multiple buses may be used, as appropriate, along with multiple memories and types of memory. Also, multiple computing devices 1000 may be connected, with a device providing a portion of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, examples of which include a magnetic or optical disk.

The storage device 1006 is capable of providing mass storage for the computing device 1000. In one implementation, the storage device 1006 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 1004, the storage device 1006, or memory on processor 1002. For example, the information carrier may be a non-transitory, machine-readable storage medium.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, e.g., a laptop computer 1022. Alternatively, components from computing device 1000 may be combined with other components in a mobile device (not shown), e.g., device 1050. Such devices may contain one or more of computing device 1000, 1050, and an entire system may be made up of multiple computing devices 1000, 1050 communicating with one other.

Computing device 1050 includes a processor 1052, memory 1064, an input/output device, e.g. a display 1054, a communication interface 1066, and a transceiver 1068, among other components. The device 1050 may also be provided with a storage device, e.g., a microdrive or other device, to provide additional storage. The components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, e.g., control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, e.g., using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, e.g., through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from one other and typically interact through a communication network. The relationship of client and server arises by virtue of computer programs running on the respective computers and having a client-server relationship to one other.

In some implementations, the engines described herein can be separated, combined or incorporated into a single or combined engine. The engines depicted in the figures are not intended to limit the systems described here to the software architectures shown in the figures.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A computer-implemented method comprising:
providing a user interface that includes first control through which a user may enter one or more query terms of a search query, and a second control through which the user may activate a search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user;
receiving (i) the search query, and (ii) data indicating that a user that submitted the search query has selected the second control to activate the search mode that selects search results for presentation without regard to at least one of geographic data, language data, user search history data, or social network information related to the user and that, when the search session ends, automatically reverts to the default search mode that selects search results for presentation using at least one of geographic data, language data, user search history data, or social network information related to the user;
based on receiving the data indicating that the user that submitted the search query has activated the search mode, selecting, using a processor, particular search results for presentation in response to the search query, without regard to at least one of geographic data, language data, user search history data, or social network information related to the user;

determining that a search session that included the received search query has ended; and in response to determining that the search session that included the received search query has ended, automatically reverting to a default search mode that selects search results for presentation using at least one of geographic data, language data, user search history data, or social network information related to the user.

2. The computer-implemented method of claim 1, further comprising:

providing for output the particular search results responsive to the search query, without regard to at least one of geographic data, language data, user search history data, or social network information related to the user.

3. The computer-implemented method of claim 1, further comprising:

identifying members using a social graph information associated with the user that have recommended or shared content associated with the search results; and providing search results corresponding to the recommended or shared content.

4. The computer-implemented method of claim 1, wherein the social network information related to the user includes a plurality of social graphs associated with the user, and wherein different types of the social graphs are generated for different connections of the users.

5. The computer-implemented method of claim 1, wherein selecting the particular search results for presentation in response to the search query, without regard to at least one of geographic data, language data, user search history data, or social network information related to the user comprises:

identifying a plurality of search result sets that include one or more search result sets with regard to at least one of geographic data, language data, user search history data, or social network information related to the user and one or more search result sets without regard to the social network information related to the user; and selecting, from the plurality of search result sets, the one or more search result sets without regard to at least one of geographic data, language data, user search history data, or social network information related to the user.

6. The computer-implemented method of claim 1, wherein automatically reverting to the default search mode comprises:

deactivating, without receiving an input from the user, the search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user.

7. A non-transitory computer-readable storage medium encoded with a computer program, the computer program comprising instructions that, when executed by one or more processors, cause the one or more processors to perform operations comprising:

providing a user interface that includes first control through which a user may enter one or more query terms of a search query, and a second control through which the user may activate a search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user;

receiving (i) the search query, and (ii) data indicating that a user that submitted the search query has selected the second control to activate the search mode that selects search results for presentation without regard to at least one of geographic data, language data, user search history data, or social network information related to the user and that, when the search session ends, automatically reverts to the default search mode that selects search results for presentation using at least one of geographic data, language data, user search history data, or social network information related to the user;

based on receiving the data indicating that the user that submitted the search query has activated the search mode, selecting particular search results for presentation in response to the search query, without regard to at least one of geographic data, language data, user search history data, or social network information related to the user;

determining that a search session that included the received search query has ended; and in response to determining that the search session that included the received search query has ended, automatically reverting to a default search mode that selects search results for presentation using at least one of geographic data, language data, user search history data, or social network information related to the user.

8. The non-transitory computer-readable storage medium of claim 7, wherein the one or more processors are further configured to perform operations comprising:

providing for output the particular search results responsive to the search query, without regard to at least one of geographic data, language data, user search history data, or social network information related to the user.

9. The non-transitory computer-readable storage medium of claim 7, wherein the social network information related to the user includes social graph information associated with the user, and wherein the one or more processors are further configured to perform operations comprising:

identifying members using the social graph information associated with the user that have recommended or shared content associated with the search results; and providing search results corresponding to the recommended or shared content.

10. The non-transitory computer-readable storage medium of claim 7, wherein the social network information related to the user includes a plurality of social graphs associated with the user, and wherein different types of the social graphs are generated for different connections of the users.

11. The non-transitory computer-readable storage medium of claim 7, wherein automatically reverting to the default search mode comprises:

deactivating, without receiving an input from the user, the search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user.

12. A system comprising:
one or more computers; and
a memory storage apparatus in communication with the one or more computers, the memory storage apparatus storing instructions that upon execution by the one or more computers cause the one or more computers to perform operations comprising:
providing a user interface that includes first control through which a user may enter one or more query terms of a search Query, and a second control through which the user may activate a search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user;
receiving (i) the search query, and (ii) data indicating that a user that submitted the search query has selected the second control to activate the search mode that selects search results for presentation without regard to at least one of geographic data, language data, user search history data, or social network information related to the user and that, when the search session ends, automatically reverts to the default search mode that selects search results for presentation using at least one of geographic data, language data, user search history data, or social network information related to the user;
based on receiving the data indicating that the user that submitted the search query has activated the search mode, selecting particular search results for presentation in response to the search query, without regard to at least one of geographic data, language data, user search history data, or social network information related to the user;
determining that a search session that included the received search query has ended; and
in response to determining that the search session that included the received search query has ended, automatically reverting to a default search mode that selects search results for presentation using at least one of geographic data, language data, user search history data, or social network information related to the user.

13. The system of claim 12, wherein the one or more computers are configured to provide for output the particular search results responsive to the search query, without regard to at least one of geographic data, language data, user search history data, or social network information related to the user.

14. The system of claim 12, wherein the social network information related to the user includes social graph information associated with the user, and
wherein the one or more computers are further configured to perform operations comprising:
identifying members using the social graph information associated with the user that have recommended or shared content associated with the search results; and
providing search results corresponding to the recommended or shared content.

15. The system of claim 12, wherein the social network information related to the user includes a plurality of social graphs associated with the user, and
wherein different types of the social graphs are generated for different connections of the users.

16. The system of claim 12, wherein automatically reverting to the default search mode comprises:
deactivating, without receiving an input from the user, the search mode that selects search results for presentation without regard to at least one of geographic data, language data, user search history data, or social network information related to the user and that, when a search session ends, automatically reverts to a default search mode that selects search results for presentation using at least one of geographic data, language data, user search history data, or social network information related to the user.

* * * * *